US008185442B2

(12) United States Patent
Kiran Vedula

(10) Patent No.: US 8,185,442 B2
(45) Date of Patent: May 22, 2012

(54) EXTENSIBLE ATTRIBUTES MODEL FOR BUSINESS APPLICATIONS

(75) Inventor: Venkata Naga Ravi Kiran Vedula, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 772 days.

(21) Appl. No.: 12/197,588

(22) Filed: Aug. 25, 2008

(65) Prior Publication Data

US 2010/0049731 A1    Feb. 25, 2010

(51) Int. Cl.
*G06Q 30/00* (2012.01)
*G06F 17/30* (2006.01)

(52) U.S. Cl. .................. 705/26.1; 705/26.61; 705/26.9; 705/27.1

(58) Field of Classification Search ......... 705/26.1–27.2
See application file for complete search history.

(56) References Cited

U.S. PATENT DOCUMENTS

| | | | | |
|---|---|---|---|---|
| 5,201,047 A * | 4/1993 | Maki et al. ............................. | 1/1 |
| 6,789,252 B1 * | 9/2004 | Burke et al. .................. | 717/100 |
| 6,834,282 B1 * | 12/2004 | Bonneau et al. ...................... | 1/1 |
| 6,928,441 B2 * | 8/2005 | Haegele ....................... | 705/26.8 |
| 6,952,705 B2 * | 10/2005 | Knoblock et al. .................... | 1/1 |
| 7,424,492 B2 * | 9/2008 | Lau et al. .............................. | 1/1 |
| 2003/0033437 A1 * | 2/2003 | Fischer et al. ................. | 709/310 |
| 2003/0149706 A1 * | 8/2003 | Neal et al. .................. | 707/104.1 |
| 2005/0114243 A1 * | 5/2005 | Scumniotales et al. ......... | 705/35 |
| 2006/0026196 A1 * | 2/2006 | Lau et al. ......................... | 707/102 |
| 2007/0226155 A1 * | 9/2007 | Yu et al. .......................... | 705/400 |
| 2008/0270363 A1 * | 10/2008 | Hunt et al. ......................... | 707/3 |
| 2008/0288889 A1 * | 11/2008 | Hunt et al. .................... | 715/810 |
| 2008/0294996 A1 * | 11/2008 | Hunt et al. .................... | 715/739 |
| 2008/0319829 A1 * | 12/2008 | Hunt et al. ...................... | 705/10 |
| 2010/0223296 A1 * | 9/2010 | Angus et al. .................. | 707/795 |
| 2011/0161384 A1 * | 6/2011 | Wykes et al. .................. | 707/822 |

OTHER PUBLICATIONS

"Cardonet Expands Product Information Management Solution With Introduction of Cardonet Synergy™ Software Offers Enhanced Capabilities for Retail Manufacturers and Distributors." PR Newswire. May 25, 2004. [recovered from Dialog on Feb. 24, 2012].*

* cited by examiner

*Primary Examiner* — Will Allen
*Assistant Examiner* — Kathleen G Palavecino
(74) *Attorney, Agent, or Firm* — Silicon Valley Patent Group LLP; Omkar Suryadevara

(57) ABSTRACT

In a method for extension of an item attribute in a business application data model, a selection is received of an item of the business application data model to which an item attribute is being added. The item attribute is received, including receipt of relationship information which defines a location of the item attribute within a hierarchy of the business application data model. The item attribute is associated with the business application data model such that the item attribute is contextually included within a searchable ontology of the hierarchy in accordance with the relationship information.

15 Claims, 7 Drawing Sheets

| ATTRIBUTE ID (121) | ATTRIBUTE VALUE (222) | APPLIED ITEM (224) |
| --- | --- | --- |
| A1 | 2525265 | LG999 |
| A2 | 32 | LG999 |
| A3 | 1024, 2678 | LG999 |
| A4 | $350 | LG999 |

220

225, 226

| ATTRIBUTE ID (131) | ATTRIBUTE VALUE (232) | APPLIED ITEM (234) |
| --- | --- | --- |
| B1 | 9897346 | ZNTH888 |
| B2 | 32 | ZNTH888 |
| B3 | 1024, 2678 | ZNTH888 |
| B4 | 555-784-5552 | ZNTH888 |
| B5 | $499 | ZNTH888 |

RECEIVE A SELECTION OF AN ITEM OF A BUSINESS APPLICATION DATA MODEL TO WHICH AN ITEM ATTRIBUTE IS BEING ADDED.
410

↓

RECEIVING THE ITEM ATTRIBUTE INCLUDING RELATIONSHIP INFORMATION DEFINING A LOCATION OF THE ITEM ATTRIBUTE WITHIN A HIERARCHY OF A BUSINESS APPLICATION DATA MODEL.
420

↓

ASSOCIATING THE ITEM ATTRIBUTE WITH THE BUSINESS APPLICATION DATA MODEL SUCH THAT THE ITEM ATTRIBUTE IS CONTEXTUALLY INCLUDED WITHIN A SEARCHABLE ONTOLOGY OF THE HIERARCHY IN ACCORDANCE WITH THE RELATIONSHIP INFORMATION.
430

↓

VALIDATING A DATA VALUE RECEIVED IN ASSOCIATION WITH THE EXTENDED ITEM ATTRIBUTE.
440

```
RECEIVE A DESTINATION LOCATION TO WHICH AN ITEM IS TO BE MOVED
WITHIN A BUSINESS APPLICATION DATA MODEL.
610
```

```
DETERMINE THAT A PRESENT ITEM ATTRIBUTE OF THE ITEM AT AN INITIAL
LOCATION IS COMMON WITH A DESTINATION ITEM ATTRIBUTE TO BE
ASSOCIATED WITH THE ITEM AT THE DESTINATION LOCATION.
620
```

```
TRANSFER A COMMON ITEM ATTRIBUTE TO THE DESTINATION LOCATION.
630
```

```
TRANSFER AN EXTENDED ITEM ATTRIBUTE FROM THE INITIAL LOCATION TO
THE DESTINATION LOCATION.
640
```

```
REFUSE TO TRANSFER A NON-COMMON ITEM ATTRIBUTE FROM THE INITIAL
LOCATION TO THE DESTINATION LOCATION.
650
```

```
ADD A NON-COMMON DESTINATION ITEM ATTRIBUTE TO THE ITEM AFTER
THE COMMON ITEM ATTRIBUTES ARE MOVED TO THE DESTINATION
LOCATION.
660
```

FIG. 6

EXTENSIBLE ATTRIBUTES MODEL FOR BUSINESS APPLICATIONS

BACKGROUND

Business applications such as electronic commerce ("e-commerce") applications, Customer Relationship Management ("CRM") applications, Human Resource Management (HRM) applications, and electronic catalogs are pervasive. One has only to shop with an online retail or auction site to experience an interaction with such a business application. Such business applications can be operated by a single merchant, business, or seller. Such business applications can also be centrally controlled or hosted to create an on line marketplace or mechanism which represents numerous merchants, businesses, or sellers.

BRIEF DESCRIPTION OF THE DRAWINGS

The accompanying drawings, which are incorporated in and form a part of this specification, illustrate embodiments of the present invention and, together with the description of embodiments, serve to explain principles discussed below.

FIG. 2 shows example data input for item attributes and extended item attributes of a business application data model, according to an embodiment of the present invention.

FIG. 4 shows a flow diagram of an example method for extension of an item attribute in a business application data model, according to an embodiment of the present invention.

FIG. 6 shows a flow diagram of an example method for validating a data value received in association with an extended item attribute of a business application data model, according to an embodiment of the present invention.

Figure 1:
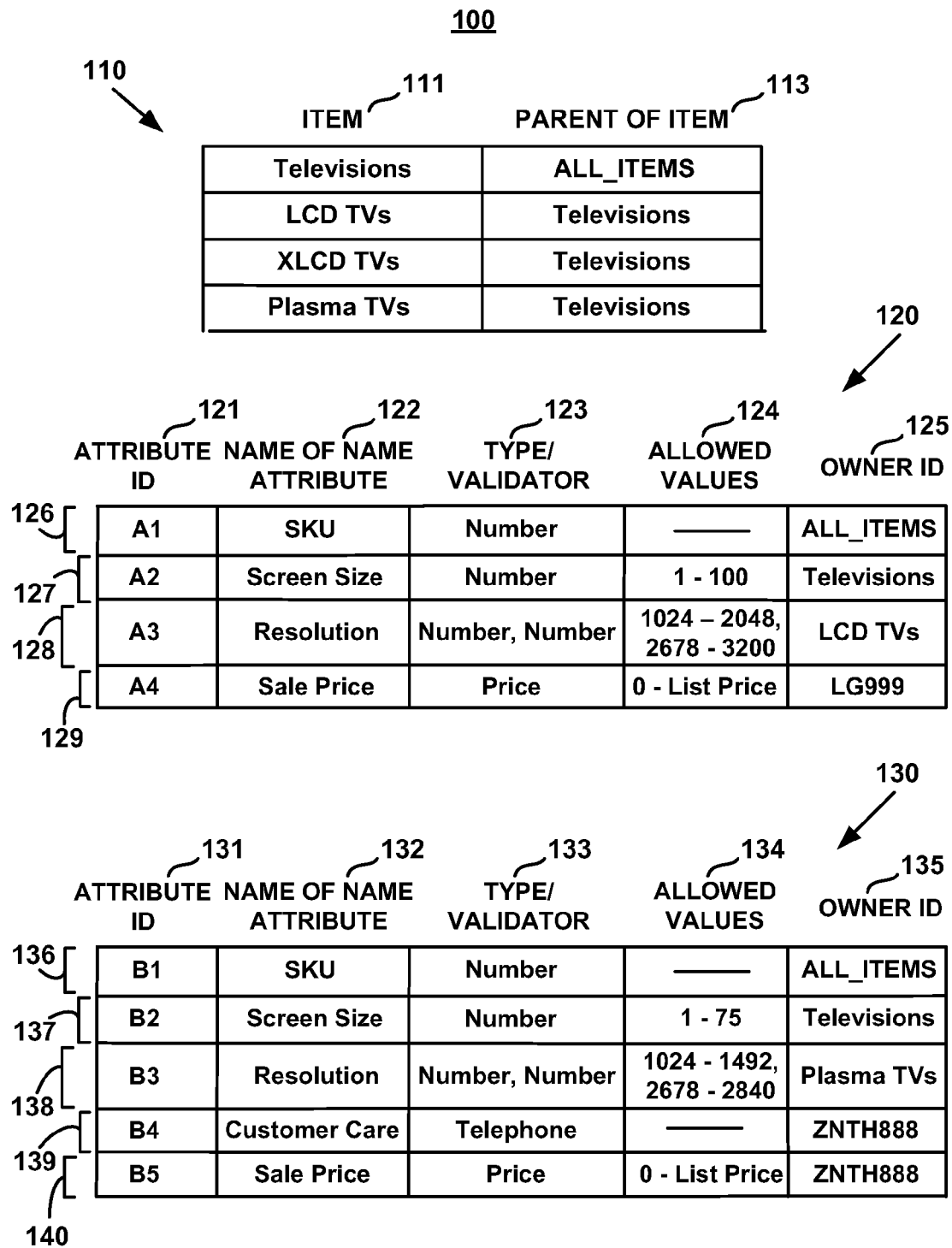
FIG. 1 is a depiction of a portion of an example business application data model with extended item attributes, in accordance with an embodiment of the present invention.

The drawings referred to in this brief description should be understood as not being drawn to scale unless specifically noted.

DESCRIPTION OF EMBODIMENTS

Reference will now be made in detail to embodiments of the present invention, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the detailed description, discussions utilizing terms such as "receiving," "adding," "including," "incorporating," "providing," "verifying," "storing," "associating," "accessing," "determining," "moving," "transferring," "refusing," "prompting," "comparing," "examining," "validating," or the like, refer to the actions and processes of a computer system, data model manipulator, attribute extender, item mover, input data validator, microcontroller, processor, or similar electronic computing device or combination of such electronic computing devices. The computer system or similar electronic computing device manipulates and transforms data represented as physical (electronic) quantities within the computer system's/device's registers and memories into other data similarly represented as physical quantities within the computer system's/device's memories or registers or other such information storage, transmission, or display devices.

Overview of Discussion

Business Applications (e.g., electronic commerce ("e-commerce") applications, Customer Relationship Management ("CRM") applications, and/or Human Resource Management (HRM) applications) are required to deal with a variety of business objects/items (referred to herein as an "item" or as "items"). Consider, for example, a business application in the form of an e-commerce application which supports an online retail sales business or online auction business. Among other functions, such an e-commerce application typically includes a large catalog of items that is offered for sale on a website, handles user updates and additions to the catalog of items, handles customer transactions for items ordered via the website, and may be involved in actions related to order fulfillment and customer satisfaction follow-up.

In an e-commerce application, for example, as described herein, each of the items (e.g., a particular television) in a catalog is included in a data model which has an "item—attribute" ontological relationship based upon the hierarchy of the item within the data model. However, in addition to the pre-existing attributes of an item, in some situations, it may be required or desirable to add one or more additional attributes to the item. These additional item attributes are secondary item attributes in that they are in addition to the primary attributes assigned to an item. These secondary attributes of items are referred to herein as "extensible" or "extended" item attributes. An example of a situation in which it is useful to add an extended item attribute to an item is when the item goes on sale and it is desired to associate a sale price with an item. Another example is where it is desired to include additional information unique to or associated only with a particular item or limited group of items. Additionally, it is sometimes desirable to add an extended item attribute at high level in the hierarchy of the business application data model so that it will flow down to progeny of the item.

When such an extended item attribute is added by a user (e.g., a seller or a business application administrator), it is useful if a context of the attribute can be ascertained by the e-commerce application so that the extended item attribute can be searched for within the data model of the e-commerce application. As described below, a new extended item attribute includes its own attribute identifier, a name, and one or more meta attributes which can comprise user provided meta attributes and/or inherited meta attributes which are inherited from a hierarchy which an item is associated. These meta attributes provide a searchable context to an extended item attribute and also act as metes and bounds type validators for data which can be user entered into a data field associated with an extended item attribute. In this manner, an extended item attribute can be included in an ontological structure of a business application data model, and user entered data can be automatically validated before being accepted for inclusion in the data model.

It is appreciated that an extensible item attribute, as described herein, is very different from a free form entry, as a free form entry does not validate entered data or fit into the ontology of a business application data model in a manner which allows searching of the data entered in the free form entry.

Likewise, an extensible item attribute is also different from a flex-field or flexible field which may be provided as a partially customizable attribute field associated with an item, as the flexible field is limited in both the number of flexible fields available and the uses for which it can be customized. Additionally, as described herein, an extensible item attribute is only added to a data model on an as required/desired basis rather than always being a part of the overhead of the business application data model as is typically the case with flexible fields.

Discussion below will begin with a description of a portion of an example business application data model with an extended item attribute with which, or upon which, embodiments described herein may operate. Example input for item attributes and extended item attributes of the business application data model will then be described. A data model manipulator for manipulating and interacting with aspects of a business application data model will be briefly described. Use and operation of a business application data model with an extended item attribute and operation of the data model manipulator will then be described in more detail in conjunction with description of example methods for: extension of an item attribute in a business application data model; moving an item in a business application data model; and validating a data value received in association with an extended item attribute of a business application data model. Finally, description will be made of an example computer system with which, or upon which, all or part of the subject matter described herein in may be practiced.

Example Business Application Data Model with Extended Item Attributes

Figure 7:
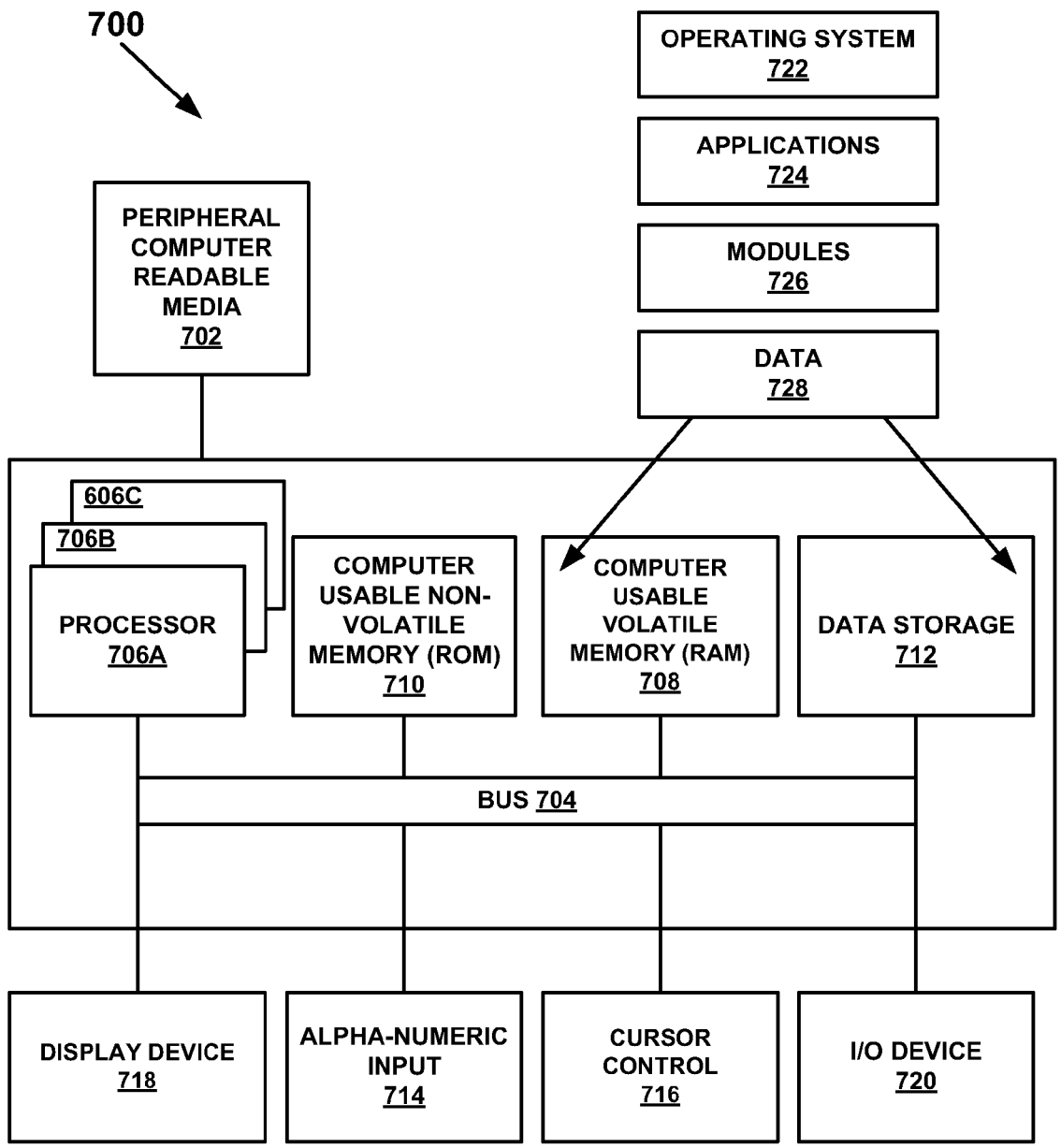
FIG. 7 shows a block diagram of an example computer system with which or upon which embodiments of the present invention can be practiced.

FIG. 1 is a depiction of a portion of an example business application data model 100 with extended item attributes (129, 139, 140), in accordance with an embodiment. Business application data model 100 illustrates part of a data model of an e-commerce application for an electronics retailer. It is appreciated that that this is a simplified example provided for illustrative purposes, and that, in many embodiments, a business application data model is much larger and more complex. In one embodiment, business application data model 100 exists as a data structure stored on a computer readable medium, such as a memory or data store of, or useable by, computer system 700 (FIG. 7).

Hierarchal relationships of items in business application data model 100 are shown in table 110, which has two columns. Column 111 lists items in business application data model 100, while column 113 lists the parent of each item listed in column 111. As can be seen "ALL_ITEMS" is a root item and has no parent. "ALL_ITEMS" is the parent of "Televisions," and "Televisions" is the parent of "LCD TVs," "XLCD TVs," and "Plasma TVs."

Table 120 shows attributes associated with an LG999 Liquid Crystal Display television, which is a particular item in business application data model 100. As depicted, there are three inherited item attributes 126, 127, 128 and one extended item attribute 129. Columns in table 120 label meta attributes, including: attribute identifiers 121, names of name attributes 122 (a kind of meta attribute), type/validator 123 (a meta attribute), allowed values 124 (a meta attribute), and owner identification 125 (a meta attribute). As utilized herein, the term "meta attribute" describes an attribute of an attribute. A meta attribute may be inherited from a parent or other hierarchical progenitor. Additionally, in some embodiments, such as with an extensible item attribute, a meta attribute may be user defined.

Table 130 shows attributes associated with a ZNTH888 plasma television, which is a particular item in business application data model 100. As depicted there are three inherited item attributes 136, 137, 138 and two extended item attributes 139 and 140. Columns in table 130 label attribute identifiers 131, names of name attributes 132 (a meta attribute), type/validator 133 (a meta attribute), allowed values 134 (a meta attribute), and owner identification 135 (a meta attribute).

An attribute identifier (121, 131) is a meta attribute comprising a code or other indicia which is uniquely associated with an attribute. For example, "A1" is the attribute identifier associated with item attribute 126. A name of name attribute (122, 132) is a meta attribute comprising a name given to the name meta attribute of an attribute. For example, "SKU" is the name associated with the name meta attribute of item attribute 126. A type and/or validator (123, 133) is a meta attribute used to validate, and thus enforce a conformity on the kind of data and format of data that is accepted as data input in a data field of an attribute. For example, "Number" is type/validator meta attribute associated with an input data field of item attribute 126. In this example, a data value input into a data field of item attribute 126, would be rejected if the data value included a non-number character. "Number," "price," and "telephone" are shown in tables 120 and table 130 as additional examples of type/validator meta attributes, but others are possible. An allowed value meta attribute (124, 134) is a meta attribute which validates the quantity or some other facet (e.g., a minimum, maximum, range, etc.) of an otherwise valid value which is input into a data field. With reference to item attribute 127, an input received in a data field of item attribute 127 which is required to be both a number and a number in the range between 1 and 100. An owner ID (125, 135) is a meta attribute which identifies the parent or other owner of an attribute. In tables 120 and 130, owner IDs 125, 135 can be used to differentiate attributes which are inherited and those which are associated only with the particular item represented by a table 120, 130.

The hierarchy of parenthood and descendants, described above, supports an attribute inheritance ontology that flows downward from the root item in business application data model 100. In one embodiment, an attribute or meta attribute associated with an attribute can be mandated at a parent level and thus forced, through inheritance, to be included in an item that is a child or other descendant of that parent.

For example, in one embodiment, an item attribute named "SKU" (shop keeping unit) is a mandatory attribute associated with the root "ALL_ITEMS." This causes the SKU item attribute (126, 136) to be inherited and associated with every item in business application data model 100. In another example, an item attribute named "Screen Size" is a mandatory attribute associated with the item class of "Televisions." This causes the Screen Size item attribute (127, 137) to be inherited and associated with every item which is a descendent of the "Televisions" item in business application data model 100. In another example, an item attribute named "Resolution" is a mandatory item attribute associated with the item class of "LCD TVs." This causes the "Resolution" item attribute (128 for example) to be inherited and associated with every item which is a descendent of the "LCD TVs" item in business application data model 100. Similarly, another item attribute named "Resolution" is a mandatory item attribute associated with the item class of "Plasma TVs." This causes the "Resolution" item attribute (138 for example) to be inherited and associated with every item which is a descendent of the "Plasma TVs" item in business application data model 100. Extended item attributes may be also made mandatory and thus inherited from a parent or progenitor in the same manner. However, no inherited extended item attributes are illustrated in FIG. 1.

In Table 120 one extended item attribute, extended item attribute 129, is shown. A user, host, administrator, or the like has added extended item attribute 129 to allow description of a sale price associated with the LG999 Liquid Crystal Display television. In Table 130 two extended item attributes, extended item attribute 139 and 140, are shown. A user, host, administrator, or the like has added extended item attribute 139 to allow description of a sale price associated with the ZNTH888 Plasma television. A user, host, administrator, or the like has added extended item attribute 140 to allow inclusion of a Customer Care telephone number associated with the ZNTH888 Plasma television.

Because of the meta attributes associated with each of these extended item attributes, any data which is input into input data fields of extended item attributes will be validated and then incorporated into a searchable ontology of business application data model 100. Thus a customer will be able to search for "Customer Care" and find a phone number associated with the ZNTH888 television. Similarly, a customer will be able to search for "sale prices" and find sale prices associated with the ZNTH888 television and the LG999 television.

Example Item Attribute and Extensible Item Attribute Inputs

FIG. 2 shows example data which has been input for item attributes and extended item attributes of business application data model 100, according to an embodiment. Table 220 shows input data for the item attributes 126, 127, 128 and extended item attribute 129 that are illustrated in table 120 of FIG. 1. Table 230 shows input data for the item attributes 136, 137, 138 and extended item attributes 139, 140 that are illustrated in table 130 of FIG. 1.

Table 220 shows input data values associated with the LG999 Liquid Crystal Display television, which is a particular item in business application data model 100. Columns in table 220 label attribute identifiers 121 (which are the same as those of table 120), attribute values 222 (data values received as input), and the applied item 224 with which the input data values are associated. Four validatable data fields are shown in the column labeled attribute value 222. These data fields are validated in accordance with their respective item attribute's associated meta attributes. The meta attributes which are used for validation are also associated with each attribute ID ("A1,", "A2," "A3," and "A4") and are illustrated in table 120. Validatable data field 225 is associated with attribute ID "A4" and extended item attribute 129 and represents one of these validatable data fields. The validated value 226 of "$350" represents a validated and searchable sale price which is stored in validatable data field 225. Validated value 226, which in one embodiment has been received by data entry, has been validated in accordance with the meta attributes (123, 124) that are associated with extended item attribute 129.

Table 230 shows input data values associated with the ZNTH888 plasma television, which is a particular item in business application data model 100. Columns in table 230 label attribute identifiers 131 (which are the same as those of table 130), attribute values 232 (data values received as input), and the applied item 234 with which the input data values are associated. Five validatable data fields are shown in the column labeled attribute value 232. These data fields are validated in accordance with their respective item attribute's associated meta attributes. The meta attributes which are used for validation are also associated with each attribute ID ("B1,", "B2," "B3," "B4," and "B5") and are illustrated in table 130. Validatable data field 235 is associated with attribute ID "B4" and extended item attribute 139 and represents one of these validatable data fields. Validatable data field 237 is associated with attribute ID "B5" and extended item attribute 140 and represents another of these five validatable data fields. The validated value 236 of "$499" represents a validated and searchable sale price which is stored in validatable data field 235. Validated value 236, which in one embodiment has been received by data entry, has been validated in accordance with the meta attributes (133, 134) that are associated with extended item attribute 139. The validated value 238 of "555-784-5552" represents a validated and searchable customer care telephone number which is stored in validatable data field 237. Validated value 238, which in one embodiment has been received by data entry, has been validated in accordance with the meta attributes (133, 134) that are associated with extended item attribute 140.

Example Data Model Manipulator

Figure 3:
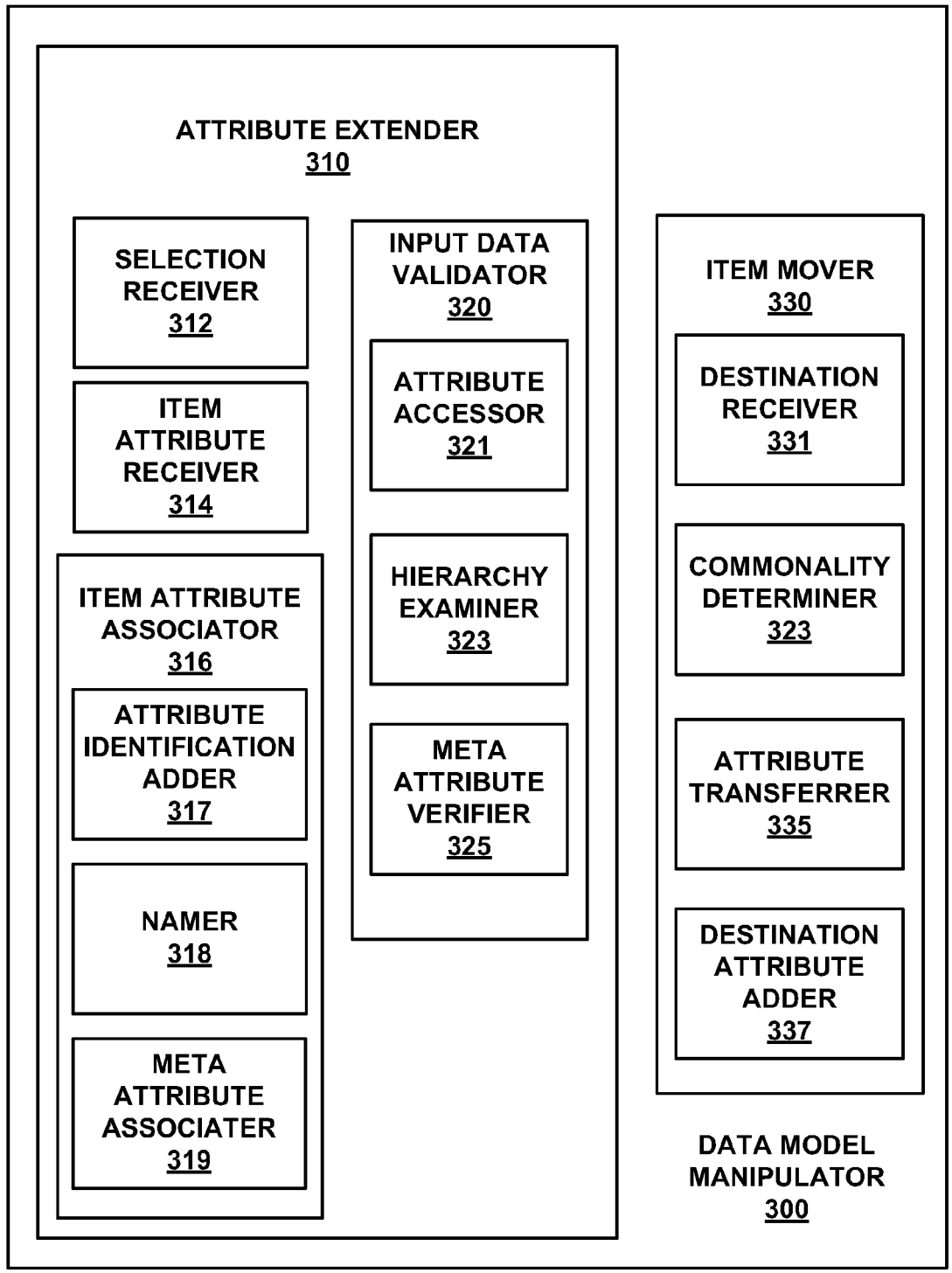
FIG. 3 shows a block diagram of an example data model manipulator, in accordance with an embodiment of the present invention.

FIG. 3 shows a block diagram of an example data model manipulator 300, in accordance with an embodiment. Data model manipulator 300 operates to alter, manipulate, or interact with one or more aspects of a business application data model. Some examples of the manipulation which data model manipulator 300 can perform include: validating a data value input to a data field of an extended item attribute; extending an item attribute in a business application data model; and moving an item within a business application data model. In one embodiment, all or part of data model manipulator 300 is implemented within or communicatively coupled with a business application data model, such as business application data model 100, or implemented within or communicatively coupled with a business application such as the business application which utilizes business application data model 100. In various embodiments, all or portions of data model manipulator 300 comprise modules of computer executable instructions which can be stored on a tangible computer readable medium and executed by a processor or computer system (e.g., computer system 700) to perform a function or functions of data model manipulator 300.

As illustrated in FIG. 3, in one embodiment, data model manipulator 300 comprises an attribute extender 310, and an input data validator 320, and an item mover 330; however, not all need be included in every embodiment.

Attribute extender 310 operates to extend an item attribute in a business application data model. In one embodiment, attribute extender 310 comprises a selection receiver 312, an item attribute receiver 314, and an item attribute associater 316. In one embodiment, item attribute associater 316 comprises an attribute identification adder 317, a namer 318, and a meta attribute associater 319. The operation of attribute extender 310 and its components/modules is described in conjunction with description of the method illustrated by flow diagram 400 (FIG. 4).

Figure 5:
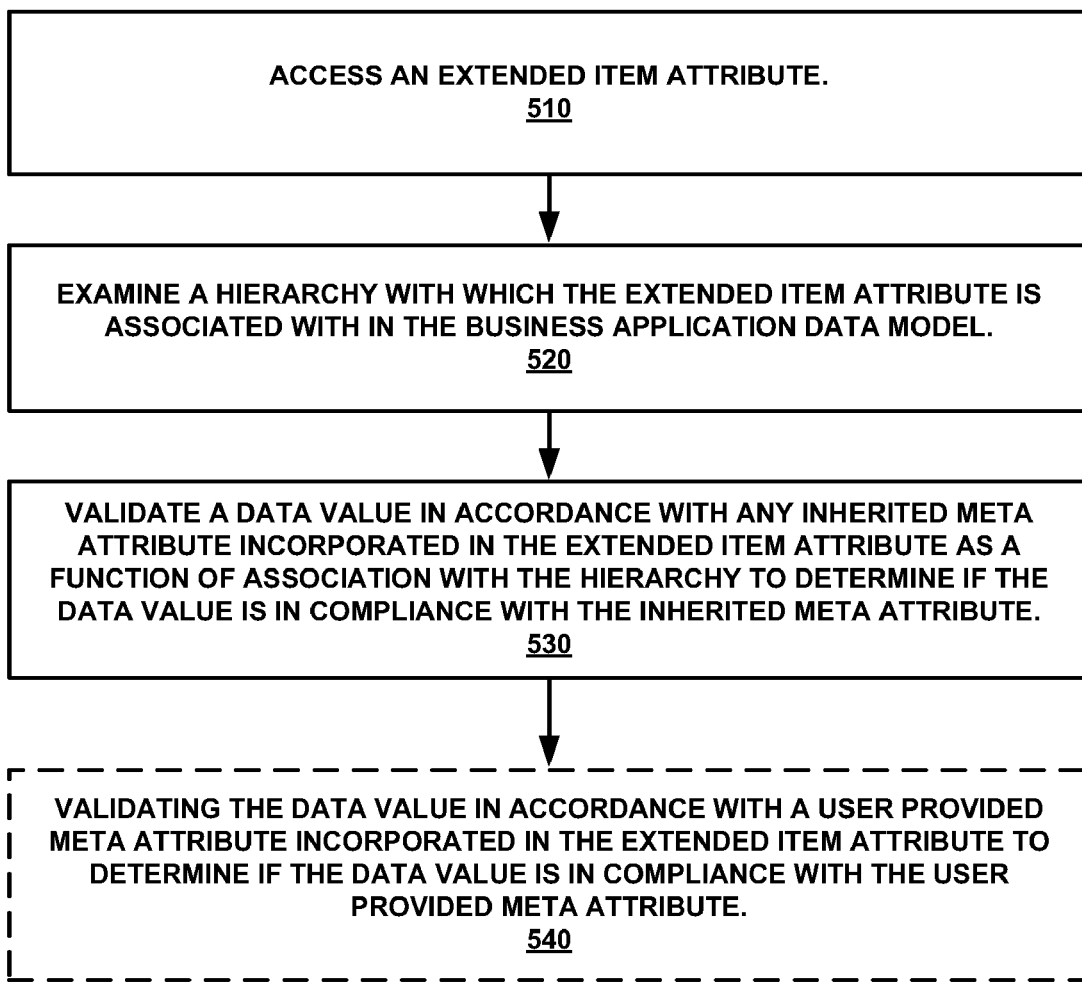
FIG. 5 shows a flow diagram of an example method for moving an item in a business application data model, according to an embodiment of the present invention.

Input data validator 320 operates to validate data values which are input into a data field associated with an extended item attribute of a business application data model. In one embodiment, input data validator 320 comprises an attribute accessor 321, a hierarchy examiner 323, and a meta attribute verifier 325. The operation of input data validator 320 and its components/modules is described in conjunction with description of the method illustrated by flow diagram 420 (FIG. 5). In one embodiment, as depicted, input data validator 320 is coupled with or a portion of attribute extender 310. In another embodiment, input data validator 320 operates independently of attribute extender 310.

Item mover 330 operates to move an item from one location to another location in a business application data model. In one embodiment, item mover 330 comprises a destination receiver 331, an attribute commonality determiner 333, an attribute transferrer 335, and a destination attribute adder 337. The operation of item mover 330 and its components/modules is described in conjunction with description of the method illustrated by flow diagram 600 (FIG. 6).

Example Methods of Operation

With reference to FIGS. 4, 5, and 6, flow diagrams 400, 440, and 600 illustrate example procedures used by various embodiments. Although specific flows of procedures are disclosed in flow diagrams 400, 440, and 600 such a flow is provided as an example. That is, embodiments are well suited to performing various other procedures or variations of the procedures recited in flow diagrams 400, 440, and 600. It is appreciated that the procedures in flow diagrams 400, 440, and 600 may be performed in an order different than presented, and that not all of the procedures in flow diagrams 400, 440, and 600 may be performed in every embodiment.

Moreover, flow diagrams 400, 440, and 600 include procedures that, in various embodiments, are carried out by a processor under the control of computer-readable and computer-executable instructions. The computer-readable and computer-executable instructions for executing the method and/or procedure illustrated by flow diagrams 400, 440, and 600 reside, for example, in any tangible computer-readable media, such as data storage features internal or external to data storage 712 (FIG. 7), volatile memory 708 (FIG. 7), and/or non-volatile memory 710 (FIG. 7). For example, in one embodiment, the computer-readable and computer-executable instructions, reside on computer-readable media such as a Read Only Memory (ROM) or firmware of a microcontroller, processor, and/or data model manipulator 300 which, is/are used to perform the procedures described in flow diagrams 400, 440, and 600. In another example, such computer-readable and computer-executable instructions may reside on a computer-readable storage media such as a diskette (e.g., a Compact Disc Read Only Memory (CD-ROM)) used to control operation of a processor in a computer system (e.g., computer system 700).

Example Method for Extension of an Item Attribute in a Business Application Data Model FIG. 4 shows a flow diagram 400 of an example method for extension of an item attribute in a business application data model, according to an embodiment. Reference will be made to portions of FIGS. 1 and 2 and components/modules of attribute extender 310 of FIG. 3 to assist in the description of the procedures of the method illustrated by flow diagram 400. By way of example and not of limitation, the procedures of the method will be described in reference to an example centered on extended item attribute 129, which is shown in table 120 of FIG. 1.

At 410 of flow diagram 400, in one embodiment, the method receives a selection of an item of a data model to which an item attribute is being added. The addition of this attribute will comprise an extension of the attributes associated with the item (i.e., and extended item attribute). In one embodiment, selection receiver 312 receives this selection, such as from a user of business application data model 100. Such a selection can be received automatically when an item is moved or modified, or manually from a user, administrator, or other person with access to a business application data model. In the case of a manual selection, such a selection can be made using a drop down menu or other user interface of selection receiver 312 which allows for selection of an item in the hierarchy of a business application data model, such as business application data model 100. In one embodiment, selection receiver 312 comprises or couples with a user interface. In one embodiment, such a user interface is provided by or on computer system 700 (FIG. 7). Consider an example, with reference to FIG. 1 and FIG. 2, in which a user selects to add an attribute to the LG999 Liquid Crystal Display television. This selection is made and then received, by selection receiver 312.

At 420 of flow diagram 400, in one embodiment, the method receives the item attribute which is being added as an extension. This includes receiving relationship information which defines a location of the item attribute within a hierarchy of the business application data model to which the item attribute is being added. In one embodiment, item attribute receiver 314 receives this selection, such as from a user of business application data model 100. This can comprise receiving information such as the owner identification for the item attribute being added (e.g., owner ID 125 of extended item attribute 129). This can also comprise receiving one or more items of other information which serve to relate the item attribute to the existing hierarchy and facilitate searching upon input data values which are input into the new attribute. Some non-limiting examples of such items of other information which are received in some embodiments include, but are not limited to: a new attribute identifier to be added/associated with the item; a name to be included as a name of a name attribute that is associated either with the attribute identifier, the added item attribute, or both; additional meta attributes, such as validator meta attributes, allowed value meta attributes, and the like.

At 430 of flow diagram 400, in one embodiment, the method associates the received item attribute with the business application data model such that the item attribute is contextually included within a searchable ontology of the hierarchy in accordance with the received relationship information. In one embodiment, item attribute associater 316 associates the received item attribute, by including all or part of the received information within a business application data model, such as business application data model 100. This can comprise storing the received item attribute into the business application data model and/or manipulating existing information in the data model such that the received item attribute is included in the business application data model.

In one embodiment, the new item attribute is contextually included within a searchable ontology of the hierarchy, at least in part, by adding a new attribute identifier to the item. In one embodiment, attribute identification adder 317 adds a new attribute identifier the selected item. With reference to FIG. 1, in one embodiment, this comprises attribute identification adder 317 adding attribute identifier "A4" to existing attribute identifiers "A1," "A2," and "A3" of the item attributes associated with the LG999 Liquid Crystal Display Television in business application data model 100. Thus, this can comprise adding another attribute identifier to a sequence of attribute identifiers associated with an item. This can also comprise associating owner identification information with the attribute identifier so that a hierarchal relationship of the extended item attribute is evident.

In one embodiment, the new item attribute is also contextually included within a searchable ontology of the hierarchy, at least in part, by naming a name meta attribute associated with the newly added attribute identifier. In one embodiment, namer 318 names the name meta attribute. This naming can be in accordance with a user provided name. For example, in one embodiment, namer 318 prompts a user or other entity such as a host or administrator to provide a name which will be used to name the name attribute associated with the extended item attribute which is being added. With reference to the example described above and illustrated in FIG. 1, in one embodiment a user, administrator, or other person with access to a business application data model provides a name, such as "Sale Price" to namer 318 to be the name of the name meta attribute of extended item attribute 129. Namer 318 then incorporates this name into application data model 100 in association with the attribute identifier added by attribute identification adder 317. By including a name, the extended attribute can be searched on by the "name."

In one embodiment, the new item attribute is also contextually included within a searchable ontology of the hierarchy, at least in part, by associating a second or additional meta attribute with the attribute identifier. This second meta attribute is in addition to the name meta attribute. In one embodiment, meta attribute associater 319 associates at least one additional meta attribute with the newly added attribute identifier. In one embodiment, meta attribute associater 319 associates a validator attribute as the second or other additional attribute associated with the newly added attribute identifier of the extended item attribute.

With reference to FIG. 1, in one embodiment, this can comprise meta attribute associater 319 associating a user provided meta attribute with the attribute identifier. For example, the allowed value 124 meta attribute (0-List Price) associated with attribute ID "A4" can be a meta attribute that is received by a user in response to a prompt for a request meta attributes. This meta attribute can be used as second level validation on an data value which is received as an input for extended item attribute 129. Similarly, in one embodiment, a user selects to include a "price" meta attribute in association with attribute identifier "A4." This price meta attribute is a validator meta attribute which can be used as a first level validator of any data value which is received as an input for extended item attribute 129. For example, if a data value of "DOG" is received it would not comport with a "price," which must be numerical (and might include a currency symbol such as a dollar sign).

In one embodiment, meta attribute associater 319 associates an inherited meta attribute with the newly added attribute identifier. For example, in one embodiment, the meta attribute of "type/validator" is a mandatory attribute associated with "ALL_ITEMS" and is thus must be included in any extended item attribute which is added to an item. A user may be able to select the kind of validator (e.g., number, telephone, prices, etc.) but one must be selected and associated with an attribute ID for any item attribute, including an extended item attribute such as extended item attribute 129. Such an inherited item attribute is determined, in one embodiment, when meta attribute associater 319 accesses the ontological hierarchy of an item in a data model and then automatically incorporates within an extended item attribute any mandatory meta attributes which are inherited from progenitors in this hierarchy.

In one embodiment, when appropriate, meta attribute associater 319 additionally provides a meta attribute validatable data field. This validatable data field is associated with a validator meta attribute which meta attribute associater 319 has associated with the newly added attribute identifier. This data field is for receiving a data entry which can be validated according to the validator meta attribute. Validatable data field 237 is one example of such a data field which, in one embodiment, meta attribute associater 319 adds to business application data model 100.

Such additional meta attributes condition/validate the data which is acceptable as an input in association with the item attribute, and thus ensure that data included in the data model has consistency needed to return valuable search results to a customer or other searcher of the data model.

At 440 of flow diagram 400, in one embodiment the method validates a data value received in association with the extended data item. This comprises validating that that the data value is in compliance applicable with meta attribute(s) of the extended data item. This validating procedure is further described in conjunction with flow diagram 440 of FIG. 5. In one embodiment, this comprises validating any data value received as an input into a data field associated with an extended item attribute.

Example Method for Validating a Data Value Received in Association with an Extended Item Attribute of a Business Application Data Model FIG. 5 shows a flow diagram 440 of an example method for validating a data value received in association with an extended item attribute of a business application data model, according to an embodiment. Reference will be made to portions of FIGS. 1 and 2 and to components/modules of input data validator 320 of FIG. 3 to assist in the description of the procedures of the method illustrated by flow diagram 440.

At 510 of flow diagram 440, in one embodiment, the method accesses an extended item attribute of a business application data model. In one embodiment, attribute accessor 321 is used to access/retrieve information stored in a data model, such as business application data model 100. The information accessed is information regarding the extended item attribute. For example, this can comprise accessing extended item attribute 140, which is shown in table 130 of FIG. 1. Attribute accessor 321 can access any of the kinds of information displayed in table 130 in conjunction with extended item attribute 140. Attribute accessor 321 can also access hierarchical information related to the extended item attribute and its associated item or other progenitors above the item.

At 520 of flow diagram 440, in one embodiment, the method examines a hierarchy with which the extended item attribute is associated with in the business application data model. In one embodiment, hierarchy examiner 323 performs this examining. The hierarchy is examined to determine if any inherited meta attributes, such as validator meta attributes, are associated via inheritance with the extended item attribute. Following the previous example involving extended item attribute 140, in one embodiment, hierarchy examiner 323 determines that the meta attribute of "Price" is a mandatory inherited validator. Although, a user may have selected the kind of meta data validator (e.g., price, telephone, number), in one embodiment, the presence of some sort of validator meta attribute has been inherited, for example, from "ALL_ITEMS."

In one embodiment, where an extended item attribute has been transferred from an initial location to a destination location, hierarchy examiner 323 examines the hierarchy of the business application data model at the destination location to determine what if any validator type attributes are inherited by the extended item attribute.

At 530 of flow diagram 440, in one embodiment, the method validates the data value in accordance with any inherited meta attribute incorporated in the extended item attribute as a function of association with the hierarchy to determine if the data value is in compliance with the inherited meta attribute. In one embodiment, meta attribute verifier 325 performs this verifying. Following the previous example, in one embodiment, meta attribute verifier 325 validates a data value that is received in validatable data field 237. For example, a data value of "DOG" would be invalidated, while a data value of "$499" would be validated as a valid price data entry. In one embodiment, a validated data value is allowed to be stored in business application data model 100, while a non-validated or invalidated data value is not. It is appreciated that if no inherited meta attribute exists, then no validation can be performed in accordance with an inherited meta attribute.

At 540 of flow diagram 440, in one embodiment, the method additionally validates the data value in accordance with a user provided meta attribute incorporated in the extended item attribute to determine whether or not the data value is in compliance with the user provided meta attribute. In one embodiment, meta attribute verifier 325 also performs verification of a data value in accordance with constraints of a user provided validator meta attribute, such as a range, minimum, maximum, or the like. Following the previous example, in one embodiment, meta attribute verifier 325 notes the allowed values 134 meta attribute of "0-List Price" is a user provided meta attribute of extended item attribute 140. If the list price is $700, then meta attribute verifier 325 determines that a data value of $499 received in validatable data field 237 is valid, and allows this valid value to be stored in business application data model 100. In a situation where the data value was instead $900 meta attribute verifier 325 would determine that this was an invalid value. Thus even though $900 constitutes a valid "Price," meta attribute verifier 325 finds it to be invalid in consideration of the previously described range meta attribute of "0-$700." This data value would be rejected by meta attribute verifier 325 and would thus not be stored in business application data model 100. It is appreciated that if no user provided meta attribute exists, then no validation can be performed in accordance with a user provided meta attribute.

Example Method for Moving an Item in a Business Application Data Model

FIG. 6 shows a flow diagram 600 of an example method for moving an item in a business application data model, according to an embodiment. Reference will be made to portions of FIGS. 1 and 2 and components/modules of item mover 330 of FIG. 3 to assist in the description of the procedures of the method illustrated by flow diagram 600.

At 610 of flow diagram 600, in one embodiment, the method receives a destination location to which an item is to be moved within a business application data model. in one embodiment, destination receiver 331 receives this destination. Consider an example where a new category of televisions, "XLCD TVs" has recently been added to business application data model 100. A user, administrator, or other person with access to business application data model 100, elects to populate an item in this new category of television items by moving an item from another category and then making minor changes as required. Following this example, in one embodiment, a user provides an input selection to destination receiver 331 to indicate that the item attributes represented by table 120 are to be copied from the initial location under the "LCD TVs" item to the destination location in the business application data model which will be located under the "XLCD TVs" item. In one embodiment, destination receiver 331 comprises a user interface provided by or on computer system 700 (FIG. 7)

At 620 of flow diagram 600, in one embodiment, the method determines that a present item attribute of the item at an initial location is common with a destination item attribute to be associated with the item at the destination location. In one embodiment, commonality determiner 333 makes such a determination by accessing item attributes at the initial location and the destination location and comparing them for commonality/non-commonality.

For example, in one embodiment, any present item attributes associated with the item at the initial location are accessed by commonality determiner 333. This can comprise commonality determiner 333 accessing a hierarchy associated with the item at the initial location to determine the inherited present item attributes of that are associated with item. Additionally, in one embodiment, this can comprise commonality determiner 333 accessing any extended present item attributes which have been added to the item at the initial location.

Similarly, in one embodiment, any destination item attributes to be associated with the item at the destination location are accessed. This can comprise commonality determiner 333 accessing a hierarchy to be associated with the item at the destination location in order to determine inherited destination item attributes to be associated with the item at the destination location. Additionally, this can comprise commonality determiner 333 accessing any extended destination item attributes which are to be added to the item at the destination location.

With respect to the item attributes associated with the LG999 Liquid Crystal Display television and shown in table 120 (the initial location), commonality determiner 333 accesses a hierarchy of this LG999 Liquid Crystal Display television to determine that item attributes 126, 127, and 128 are inherited and that item attribute 129 is an extended item attribute which has been added. Even an unpopulated destination location will still be subject to inherited item attributes which are common with item attributes 126 (whose parent is "ALL_ITEMS") and 127 (whose parent is "Televisions"). Thus, in this example where "XLCD TVs" is not yet populated, item attributes 126 and 127 will be common and item attributes 128 and 129 will not be common. However, it is appreciated that, in other embodiments, item attribute 128 and/or 129 may be common with item attributes at the destination location.

At 630 of flow diagram 600, in one embodiment, the method transfers a common item attribute to the destination location along with the item. In one embodiment, attribute transferrer 335 accomplishes this transfer by moving or linking the common item attribute to the destination location. In one embodiment, attribute transferrer 335 also transfers a data value associated with the common attribute. For example, if item attribute 126 is common, it is transferred to the destination location. In one embodiment a data value (2525265) associated with the SKU is also transferred in conjunction with the transfer of item attribute 126. This data value can be changed at a later time if desired. In one embodiment, the common attribute is transferred as a shell with an empty data value which can then be filled at a later time. As an item is made of its attributes, moving common attributes effectuates the movement of the item to the extent that it can be moved to a different hierarchical location within the business application data model. If a common item attribute is not identified or determined, then no common item attribute is transferred.

At 640 of flow diagram 600, in one embodiment, the method transfers an extended item attribute from the initial location to the destination location. In one embodiment, attribute transferrer 335 accomplishes this transfer by moving or linking any extended item attribute present at the initial location over to the destination location. For example, extended item attribute 129 is transferred from the initial location to the destination location. In one embodiment, attribute transferrer 335 also transfers a data value associated with the extended item attribute. In one embodiment, transfer of a value associated with an extended item attribute is accomplished in the same fashion as described above for the transfer of a value associated with a common attribute. If an extended item attribute is not identified at the initial location, then no extended item attribute is transferred. By transferring an extended item attribute in this manner, it does not have to be recreated from scratch at the destination location.

At 650 of flow diagram 600, in one embodiment, attribute transferrer 335 refuses to transfer a non-common item attribute from the initial location to the destination location. For example, if item attribute 128 is determined to be non-common between the initial location and the destination location, it is not transferred with along with other data and information related to the item as it does not fit in at with the hierarchical ontology of the destination location.

At 660 of flow diagram 600, in one embodiment, the method adds a non-common destination item attribute to the item after common item attributes are moved to the destination location. In one embodiment, destination attribute adder 337 adds this non-common attribute. Consider an example, where the item "XLCD TV's" has an item attribute "C3" which is named "Aspect Ratio." As this is an inherited destination item attribute that is not common with the initial item attributes, destination attribute adder 337 adds it to the data and information which is moved from the initial location to the destination location. In one embodiment, destination attribute adder 337 also initiates or provides a prompt, within a user interface, which indicates that a user needs to fill an unfilled value associated with a data field of a non-common destination item attribute which has been added.

Example Computer System Environment

FIG. 7 shows a block diagram of an example computer system 700 according to an embodiment. With reference now to FIG. 7, portions of the subject matter comprise or can comprise computer-readable and computer-executable instructions that reside, for example, in computer-usable media of a computer system. That is, FIG. 7 illustrates one example of a type of computer that can be used to implement embodiments of the subject matter which are discussed herein. FIG. 7 illustrates an example computer system 700 used in accordance with embodiments of the subject matter. It is appreciated that computer system 700 of FIG. 7 is an example, and that the subject matter can operate on or within a number of different computer systems including general purpose networked computer systems, embedded computer systems, optical computer systems, virtual computer systems, database systems, server devices, client devices, various intermediate devices/nodes, stand alone computer systems, and the like. As shown in FIG. 7, computer system 700 of FIG. 7 is well adapted to having peripheral computer readable media 702 such as, for example, a floppy disk and drive, a compact disc and drive, a digital versatile disk and drive, and the like coupled thereto.

Computer system 700 of FIG. 7 includes an address/data bus 704 for communicating information, and a processor 706A coupled to bus 704 for processing information and instructions. As depicted in FIG. 7, computer system 700 is also well suited to a multi-processor environment in which a plurality of processors 706A, 706B, and 706C are present. Conversely, computer system 700 is also well suited to having a single processor such as, for example, processor 706A. Processors 706A, 706B, and 706C may be any of various types of microprocessors.

Computer system 700 also includes data storage features such as a computer usable volatile memory 708, e.g. random access memory (RAM), coupled to bus 704 for storing information and instructions for processors 706A, 706B, and 706C. Computer system 700 also includes computer usable non-volatile memory 710, e.g. read only memory (ROM), coupled to bus 704 for storing static information and instructions for processors 706A, 706B, and 706C. Also present in computer system 700 is a data storage 712 (e.g., one or more magnetic disks and drives, optical disks and drives, and/or solid state storage units such as flash memory) coupled to bus 704 for storing information and/or instructions.

Computer system 700 also includes, in one embodiment, an optional alphanumeric input device 714 including alphanumeric and function keys coupled to bus 704 for communicating information and command selections to processor 706A or processors 706A, 706B, and 706C. Computer system 700 also includes, in one embodiment, an optional cursor control device 716 coupled to bus 704 for communicating user input information and command selections to processor 706A or processors 706A, 706B, and 706C. Computer system 700 of the present embodiment also includes, in one embodiment, an optional display device 718 coupled to bus 704 for displaying information.

Referring still to FIG. 7, optional display device 718 may be a liquid crystal device, cathode ray tube, plasma display device or other display device suitable for creating, presenting, or displaying graphic images and/or symbols or alphanumeric characters recognizable to a user. Optional cursor control device 716 allows the computer user to dynamically signal the movement of a visible symbol (cursor) on a display screen of display device 718. Many implementations of cursor control device 716 are known in the art including a trackball, mouse, touch pad, joystick, directional and input keys on a multimedia remote control, or special keys on alphanumeric input device 714 capable of signaling movement of a given direction or manner of displacement. Alternatively, it will be appreciated that a cursor can be directed and/or activated via input from alphanumeric input device 714 using special keys and key sequence commands. Computer system 700 is also well suited to having a cursor directed by other means such as, for example, voice commands.

Computer system 700 also includes, in one embodiment, an I/O device 720 for coupling computer system 700 with external entities. For example, in one embodiment, I/O device 720 is a modem for enabling wired or wireless communications between computer system 700 and an external network such as, but not limited to, the Internet.

Referring still to FIG. 7, various other components are depicted for computer system 700 and may be included in various embodiments. Specifically, when present, an operating system 722, applications 724, modules 726, and data 728 are shown as typically residing in one or some combination of computer usable volatile memory 708, e.g. random access memory (RAM), and data storage 712. In some embodiments, the subject matter discussed herein is stored, for example, as an application 724 or module 726 in memory locations within RAM 708, computer readable media within data storage 712, and/or peripheral computer readable media 702.

Example embodiments of the present invention are thus described. Although the embodiments of the present invention have been described in a language specific to structural features and/or methodological acts, it is to be understood that the embodiments of the present invention defined in the appended claims are not necessarily limited to the specific features or acts described above. Rather, the specific features and acts described above are disclosed as example forms of implementing the claims.

What is claimed is:

1. A method for extension of a business application data model stored in one or more non-transitory computer-readable storage media, said method comprising:
receiving via a user interface, a selection of an item in a hierarchy of said business application data model;
receiving a new attribute of said item;
a computer system associating a new attribute identifier of said new attribute with said item;
at least one processor in the computer system incorporating into said business application data model a user provided name of the new attribute in association with the new attribute identifier such that said new attribute is included within a searchable ontology of said hierarchy, wherein the user provided name is received in response to a prompt to provide said name;
associating a user provided meta attribute with the new attribute identifier, wherein the user provided meta attribute is received in response to another prompt to provide said meta attribute;
determining whether a data value received as input for the new attribute of the item is valid, at least by validating the data value in accordance with an inherited meta attribute and by validating the data value in accordance with the user provided meta attribute;
wherein the inherited meta attribute for the new attribute identifier is determined automatically from a mandatory meta attribute of a progenitor of said item in said hierarchy; and
storing the data value in the business application data model when the data value is determined to be valid.

2. The method of claim 1 further comprising:
accessing said new attribute of said business application data model;
examining said hierarchy with which said new attribute is associated with in said business application data model; and
retrieving said mandatory meta attribute from said progenitor in said business application data model.

3. The method of claim 1 further comprising:
receiving a destination location to which the item is to be moved within said hierarchy of said business application data model;
determining that a present item attribute of said item at an initial location in said hierarchy is common with the new attribute to be associated with said item at said destination location;
transferring a common item attribute from said initial location to said destination location; and
transferring an extended item attribute from said initial location to said destination location.

4. The method of claim 1 wherein:
the selection of the item is received through a drop down menu.

5. The method of claim 1 wherein:
said item is associated with a sequence of attributes in addition to said new attribute.

6. The method of claim 1 wherein:
said user provided meta attribute comprises, as a maximum for said data value, another value of another attribute of said item.

7. A non-transitory computer-readable medium having computer-executable instructions for performing a method, said method comprising:
receiving via a user interface, a selection of an item in a hierarchy of a business application data model;
receiving a new attribute of said item;
associating a new attribute identifier of said new attribute with said item;
incorporating into said business application data model a user provided name of the new attribute in association with the new attribute identifier such that said new attribute is included within a searchable ontology of said hierarchy, wherein the user provided name is received in response to a prompt to provide said name;
wherein the user provided name is received in response to a prompt to provide said name;
associating a user provided meta attribute with the new attribute identifier, wherein the user provided meta attribute is received in response to another prompt to provide said meta attribute;
determining whether a data value received as input for the new attribute of the item is valid, at least by validating the data value in accordance with an inherited meta attribute and by validating the data value in accordance with the user provided meta attribute;
wherein the inherited meta attribute for the new attribute identifier is determined automatically from a mandatory meta attribute of a progenitor of said item in said hierarchy;
storing the data value in the business application data model when the value is determined to be valid.

8. The computer readable medium as recited in claim 7, wherein said method further comprises:
determining that a present attribute of said item at an initial location in said hierarchy is common with said new attribute to be associated with said item at a destination location in said hierarchy; and
refusing to transfer a non-common attribute from said initial location to said destination location.

9. The computer readable medium as recited in claim 7, wherein said method further comprises:
- determining that a present attribute of said item at an initial location in said hierarchy is common with said new attribute to be associated with said item at a destination location in said hierarchy;
- moving the present attribute to said destination location; and
- adding a non-common destination attribute to said item after said present attribute is moved to said destination location.

10. The computer readable medium as recited in claim 7, wherein said method further comprises:
- determining that a present item attribute of said item at an initial location in said hierarchy is common with said new attribute to be associated with said item at a destination location in said hierarchy;
- accessing any present item attributes associated with said item at said initial location;
- accessing any new attributes to be associated with said item at said destination location; and
- comparing said present item attributes with said new attributes to determine if a commonality exists.

11. The computer readable medium as recited in claim 10, wherein said accessing any present item attributes comprises:
- accessing said hierarchy associated with said item at said initial location to determine inherited present item attributes of said item; and
- accessing any extended present item attributes added to said item at said initial location.

12. The computer readable medium as recited in claim 10, wherein said accessing any new attributes to be associated with said item at said destination location comprises:
- accessing a new hierarchy to be associated with said item at said destination location to determine inherited new attributes to be associated with said item at said destination location.

13. The computer readable medium as recited in claim 7, wherein said method further comprises:
- determining that a present attribute of said item at an initial location in said hierarchy is common with said new attribute to be associated with said item at a destination location in said hierarchy; and
- transferring a value associated with said present attribute to the destination location.

14. The non-transitory computer-readable medium of claim 7 wherein the method further comprising:
- receiving a destination location to which the item is to be moved within said hierarchy of said business application data model;
- determining that a present attribute of said item at an initial location in said hierarchy is common with the new attribute to be associated with said item at said destination location;
- transferring a common item attribute from said initial location to said destination location; and
- transferring an extended item attribute from said initial location to said destination location.

15. A computer system comprising:
- means for receiving via a user interface, a selection of an item in a hierarchy in a business application data model stored in one or more non-transitory computer-readable storage media;
- means for receiving a new attribute of said item;
- means for associating a new attribute identifier of said new attribute with said item;
- means for incorporating into said business application data model a user provided name of the new attribute in association with the new attribute identifier such that said new attribute is included within a searchable ontology of said hierarchy, wherein the user provided name is received by means for prompting to provide said name;
- means for associating a user provided meta attribute with the new attribute identifier, wherein the user provided meta attribute is received in response to another prompt to provide said meta attribute;
- means for determining whether a data value received as input for the new attribute of the item is valid, at least by validating the data value in accordance with an inherited meta attribute and by validating the data value in accordance with the user provided meta attribute;
- wherein the inherited meta attribute for the new attribute identifier is determined automatically by said means for determining from a mandatory meta attribute of a progenitor of said item in said hierarchy in said business application data model stored in said one or more non-transitory computer-readable storage media;
- means for storing the data value in the business application data model when the data value is determined to be valid by said means for determining; and
- means for searching for the user provided name in said searchable ontology to find the data value.

* * * * *

UNITED STATES PATENT AND TRADEMARK OFFICE
CERTIFICATE OF CORRECTION

PATENT NO. : 8,185,442 B2  
APPLICATION NO. : 12/197588  
DATED : May 22, 2012  
INVENTOR(S) : Kiran Vedula It is certified that error appears in the above-identified patent and that said Letters Patent is hereby corrected as shown below:

In column 3, line 58, delete "that that" and insert -- that --, therefor.

In column 10, line 32, delete "that that" and insert -- that --, therefor.

In column 12, line 7, delete "in one" and insert -- In one --, therefor.

In column 12, line 23, delete "(FIG. 7)" and insert -- (FIG. 7). --, therefor.

In column 15, line 66, in Claim 2, delete "with in" and insert -- within --, therefor.

In column 16, line 58, in Claim 7, after "the" insert -- data --.

Signed and Sealed this  
Twenty-eighth Day of August, 2012

David J. Kappos  
*Director of the United States Patent and Trademark Office*